J. C. STRONG.
REGISTERING FARE-BOXES.

No. 186,380. Patented Jan. 16, 1877.

Chas Strong
Geo. A Strong
} Witnesses.

James C. Strong, Inventor

N. PETERS, PHOTO-LITHOGRAPHER, WASHINGTON, D. C.

J. C. STRONG.
REGISTERING FARE-BOXES.

No. 186,380. Patented Jan. 16, 1877.

Witnesses
Chas Strong
Geo. A. Strong

James C. Strong, Inventor

UNITED STATES PATENT OFFICE.

JAMES C. STRONG, OF BUFFALO, NEW YORK.

IMPROVEMENT IN REGISTERING FARE-BOXES.

Specification forming part of Letters Patent No. 186,380, dated January 16, 1877; application filed November 22, 1876.

*To all whom it may concern:*

Be it known that I, JAMES C. STRONG, of the city of Buffalo, county of Erie, and State of New York, have invented a new and useful Improvement in Ticket-Boxes for the use of railroads, street-cars, omnibuses, ferries, polling-boxes, &c., whenever it is necessary or convenient to register the number received, or the amount of money represented by them, or to register the number of tickets received, and sound an alarm as each ticket is deposited, without reference to the amount of money received; and I do declare that the following is a true and accurate description thereof, reference being had to the accompanying drawings, and to the letters of reference marked thereon, and being a part of this specification.

One of the principles of the invention is that the actual first receptacle of the ticket is a revolving hollow wheel.

I will now describe the invention, reference being had to the accompanying drawings.

Figure 1 is a front elevation. Fig. 2 is a view of the mechanism with the outer plate removed. Fig. 3 is a top plan view of the mechanism. Fig. 4 is a sectional view of the wheel ticket-receiver, with the ticket inserted. Fig. 5 is a sectional view, showing the wheel ticket-receptacle locked against backward movement. Fig. 6 is a sectional view, showing the wheel ticket-receptacle in the act of operating the register and alarm. Fig. 7 is a sectional view of the wheel ticket-receptacle, with the ticket released. Fig. 8 is an elevation, showing a modification of the invention, with the upper portion of the front plate removed to expose the mechanism. Fig. 9 is a cross-section, showing the wheel ticket-receptacle in the position of receiving the ticket. Fig. 10 is a similar view, showing the wheel ticket-receptacle in the act of discharging the ticket. Fig. 11 is a side elevation of the disk, and the mechanism connected with the wheel ticket-receptacle for preventing its return movement before its forward movement is completed.

Like letters indicate like parts in each figure.

In Fig. 1, A represents the box into which the tickets are deposited. This box is usually from one and a quarter to one and a half inch thick, about four inches deep, and about six inches wide. The inner face (which is the door side) is made a little concave, that it may the better fit the body when it is strapped on, by means of straps fastened in the eyes *m*. This box is strapped upon the body, either in front or under the left arm, whichever is most convenient to the conductor. A' represents little compartments made in the box A, in which to place tickets representing different cash-fares on a street-railroad. The tickets on the box in the drawing represent three, six, eight, and ten cent cash-fares. The opening A''' is a glass window through which the ticket may be seen to fall into the box by the passenger. These tickets are held in position by the doors A'', which are made to continually press upon them, whether many or few, by means of a spring, *z*, at the bottom. L is the disk or knob revolved by the thumb and finger of the conductor, and which operates the wheel-receptacle and all the other mechanism.

In Fig. 2, B represents the revolving-wheel ticket-receptacle; H, $H^1$, $H^2$, and $H^3$, the ratchet-wheel and registering-wheels, the ratchet-wheel H also being a registering-wheel. *h* is a pawl that prevents the ratchet-wheel from turning back. *i* is the end of the bell-crank, which is operated upon by the cog *c*, when pushed out by a ticket. *g* is a pawl that fits into one of the beveled notches *d* in the end of the cog *c*, for the purpose of drawing out the cog *c*, as more particularly shown in Fig. 7, for the purpose of relieving the ticket 3 from the pressure of the spring that operates the cog *c*, when it is time for the ticket to drop into the box. *f* is a pin, which operates in another notch in the end of the cog *c*, and performs the same service that the pawl *g* does, only that the pin *f* draws out the cog *c*, at the time the ticket is to be deposited, so as to leave the cavity in the wheel-receptacle, marked *b*, in Fig. 3, open, free for the ticket to drop. *e* is a pawl, against which the cog *c* hits when pressed out by a ticket, so that the receptacle-wheel B cannot return to receive another ticket until it has deposited the one it already has in the box. The cog *c* is so adjusted that when a ticket is in the cavity $b$ the edge of the ticket presses against a spring on the inside end of the cog $c$, and presses the cog $c$ out so far that when the receptacle-wheel is turned around far enough, the outer end of the cog $c$ will reach and operate the bell-crank $i$ and the ratchet-wheel H; but when no ticket is in the receptacle-wheel, the cog $c$ will not reach or operate the bell or ratchet wheel.

The figure 3 in Figs. 1, 4, 5, 6, and 7 represents a ticket in various positions.

In Fig. 3, $a$ represents the door of the box; $a^1$, the lock; and $a^3$, the partition between the mechanism and the place into which the tickets are deposited, and through which the numbers on the register-wheels show; I, the bell, and $i''$ the bell-hammer. All the other letters have been previously described. The box is locked with a seal-lock.

Figure 1:
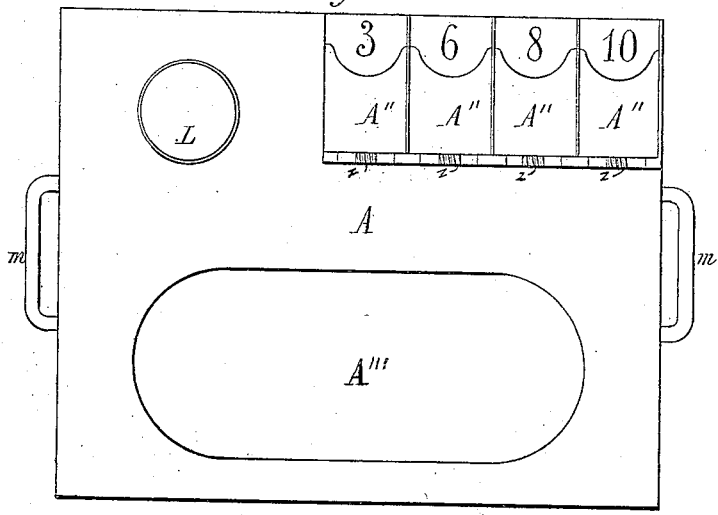
Figure 2:
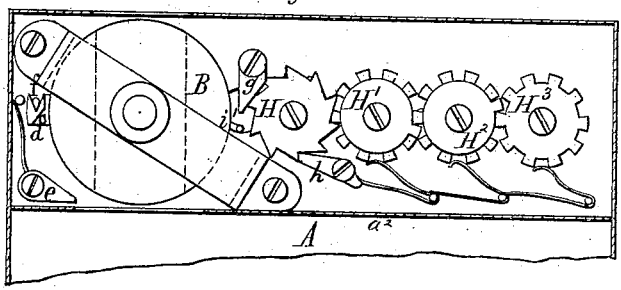
Figure 3:
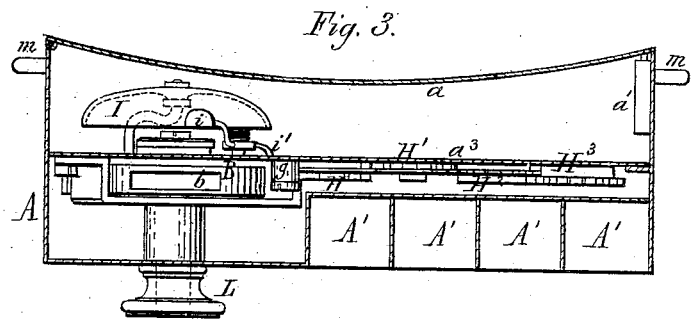
Figure 4:
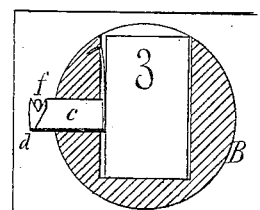
Fig. 4 shows the position of cog $c$ when being operated upon by pin $f$, for the insertion of the ticket.
Figure 5:
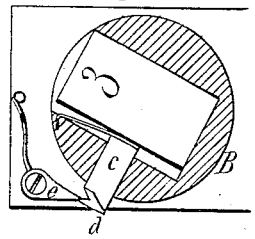
Fig. 5 shows the position of cog $c$ as operated upon by the pawl $e$, which prevents the return of the receiving-wheel B until the ticket is deposited, the alarm sounded, and ticket registered.
Figure 6:
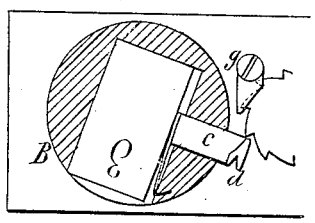
Fig. 6 shows the position of cog $c$ in the act of turning the ratchet-wheel and register H.
Figure 7:
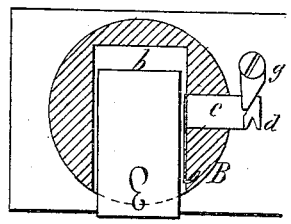
Fig. 7 shows the position of cog $c$ as operated upon by the pawl $g$, which draws it out to its farthest extent, thus relieving the ticket from all pressure, and enabling it to easily drop into the box.
Figure 8:
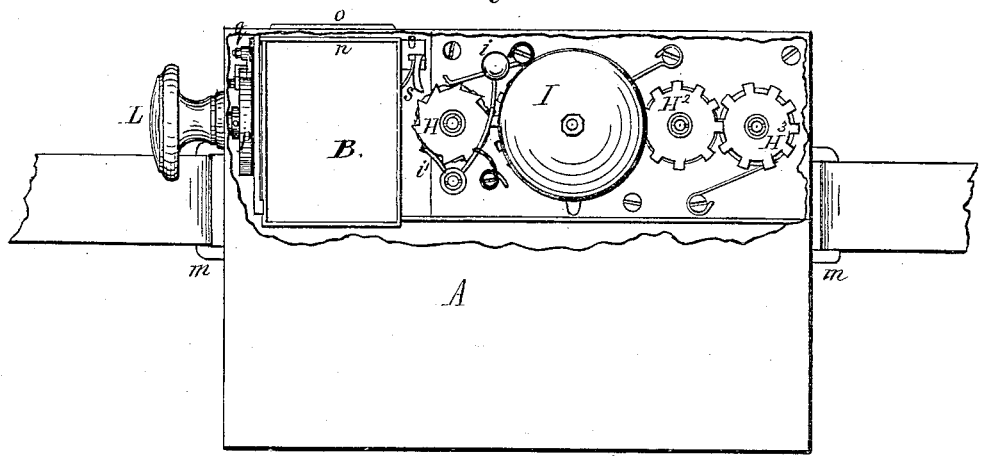

Fig. 8 represents same box, with a slight variation in the mechanism, showing a modification of the invention. The change is merely in the shape of the wheel, and the little changes in the mechanism rendered necessary thereby. B is the hollow receiving-wheel; $o$, the place for depositing the ticket; $s$, the crank that turns the ratchet and registering wheels, on being operated upon on its other end by the turning of the wheel, and the ratchet-wheel H operates the bell-crank $i$. $n$ is the periphery of the receiving-wheel, which covers up the hole $o$ as soon as the wheel is turned a trifle, to prevent anything passing through $o$ until it can be properly deposited in the receiving-wheel. $p$ and $q$ will be described in Fig. 11.

Figure 9:
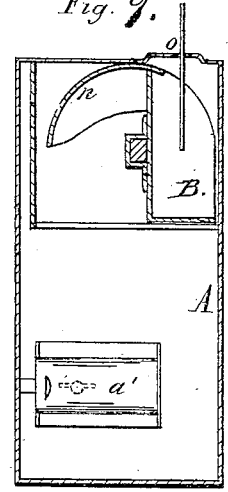

Fig. 9 represents the hollow receiving-wheel in the position of receiving a ticket. $o$, the opening through which a ticket is represented as dropping; $a^1$, the lock.

Figure 10:
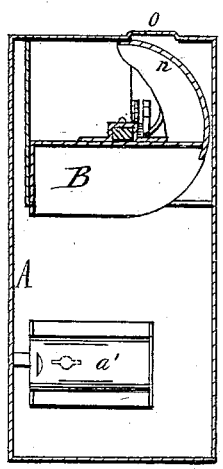

Fig. 10 represents the hollow receiving-wheel B in the act of discharging the ticket into the box.

Figure 11:
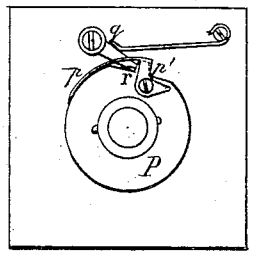

Fig. 11 represents a wheel, P, in which is coiled the spring that throws the receiving-wheel B back into its proper place to receive a ticket after having discharged one into the box. On this wheel P is fastened a spring, $p$, of the shape represented. $r$ is a pawl, held firmly upon the periphery of the wheel P by the spring $q$. This pawl $r$ has a small crank or arm upon it, which falls into a notch in the wheel P, and prevents the wheel B turning back, as aforesaid. This wheel P is fastened firmly to the disk or knob L, which, in turn, is fastened firmly to, and operates, the wheel B. When the disk L is turned forward, the crank or arm on the pawl $r$ is under the spring $p$; but at the instant the alarm is struck, and the ticket dropped into the box and registered, this crank or arm reaches the end of the spring $p$, and rides back on top of the spring $p$, thus passing over the notch in the wheel P, and thus allowing the receiving-wheel B to regain its normal condition, ready to receive another ticket.

The box can register up to one hundred thousand.

Having fully described my invention, I desire to secure by Letters Patent—

1. In combination with a ticket-box, a revolving hollow wheel, in which a ticket is received, and by means of which ticket, as the wheel is revolved, a bell is sounded and a number registered.

2. In a ticket-box, a rotary hollow wheel, into which the ticket is placed, combined with a revolving hollow disk, P, by turning which disk the ticket is deposited into the ticket-receptacle of the box, a bell sounded, and a number registered, substantially as set forth.

3. A wheel containing a cavity into which a ticket can be placed, in combination with a ticket-box, and also in combination with the cog $c$, pawls $g$ and $e$, pin $f$, ratchet-wheel H, and bell-crank $i$, or their equivalents, for the purposes described.

4. In combination with a ticket-box, a revolving hollow wheel, and also in combination with the notched spring-wheel P, pawl $r$, and spring $p$, crank S, ratchet H, operating registering-wheels $H^1$ $H^2$ $H^3$, and bell crank $i$, or their equivalents, for the uses and purposes described.

5. In combination with a ticket-box, substantially as described, ticket compartments or pockets A′, each provided with a spring door or cover, A″ $z$, substantially as described.

JAMES C. STRONG.

Witnesses:
GEO. A. STRONG,
JULIUS JEUTTER.